United States Patent
Sundaresan et al.

(10) Patent No.: US 12,086,191 B2
(45) Date of Patent: Sep. 10, 2024

(54) SYSTEM AND METHOD FOR TOPIC EXTRACTION AND OPINION MINING

(71) Applicant: eBay Inc., San Jose, CA (US)

(72) Inventors: Neelakantan Sundaresan, Mountain View, CA (US); Yongzheng Zhang, San Jose, CA (US); Catherine Baudin, Palo Alto, CA (US); Dan Shen, Shanghai (CN); Shen Huang, Shanghai (CN)

(73) Assignee: EBAY INC., San Jose, CA (US)

( * ) Notice: Subject to any disclaimer, the term of this patent is extended or adjusted under 35 U.S.C. 154(b) by 1512 days.

(21) Appl. No.: 16/419,908

(22) Filed: May 22, 2019

(65) Prior Publication Data
US 2019/0377763 A1 Dec. 12, 2019

Related U.S. Application Data

(63) Continuation of application No. 15/357,018, filed on Nov. 21, 2016, now Pat. No. 10,339,184, which is a
(Continued)

(51) Int. Cl.
*G06F 16/93* (2019.01)
*G06F 16/33* (2019.01)
*G06F 16/36* (2019.01)
*G06F 16/583* (2019.01)
*G06F 40/30* (2020.01)
(Continued)

(52) U.S. Cl.
CPC ............ *G06F 16/93* (2019.01); *G06F 16/334* (2019.01); *G06F 16/3344* (2019.01); *G06F 16/36* (2019.01); *G06F 16/5846* (2019.01); *G06F 40/30* (2020.01); *G06Q 10/00* (2013.01); *G06Q 30/00* (2013.01)

(58) Field of Classification Search
CPC .... G06F 16/93; G06F 16/334; G06F 16/3344; G06F 16/36; G06F 16/5846; G06F 40/30; G06Q 10/00; G06Q 30/00
See application file for complete search history.

(56) References Cited

U.S. PATENT DOCUMENTS

| | | |
|---|---|---|
| 7,788,086 B2 | 8/2010 | Corston et al. |
| 7,930,302 B2 | 4/2011 | Bandaru et al. |

(Continued)

OTHER PUBLICATIONS

Wilson, Recognizing Contextual Polarity: An Exploration of Features for Phrase-Level Sentiment Analysis, 3): pp. 399-433, (Year: Sep. 1, 2009).*

(Continued)

*Primary Examiner* — Albert M Phillips, III
(74) *Attorney, Agent, or Firm* — SCHWEGMAN LUNDBERG & WOESSNER, P.A.

(57) ABSTRACT

Methods, apparatus, and systems to determine a niche market of items or services, the first phase of which identifies a gap between demand and supply for a set of items. Session logs may be evaluated to compare transactions involving a specific item to those of a larger group of items. The resultant information identifies areas of high demand, but with low availability. The niche market information may be provided as direct merchandising items for sellers. In one example, the method generates niche market item web pages in specific categories. Additional methods, apparatus, and systems are disclosed.

20 Claims, 12 Drawing Sheets

Related U.S. Application Data continuation of application No. 14/020,421, filed on Sep. 6, 2013, now Pat. No. 9,514,156, which is a continuation of application No. 12/568,583, filed on Sep. 28, 2009, now Pat. No. 8,533,208.

(51) Int. Cl.
  *G06Q 10/00* (2023.01)
  *G06Q 30/00* (2023.01)

(56) References Cited

U.S. PATENT DOCUMENTS

| | | | |
|---|---|---|---|
| 8,533,208 | B2 | 9/2013 | Sundaresan et al. |
| 8,977,953 | B1* | 3/2015 | Pierre .................. G06F 40/289 |
| | | | 715/201 |
| 9,514,156 | B2 | 12/2016 | Sundaresan et al. |
| 10,339,184 | B2 | 7/2019 | Sundaresan et al. |
| 2005/0034071 | A1 | 2/2005 | Musgrove et al. |
| 2005/0091038 | A1 | 4/2005 | Yi et al. |
| 2006/0069589 | A1 | 3/2006 | Nigam et al. |
| 2008/0215543 | A1 | 9/2008 | Huang et al. |
| 2008/0215571 | A1 | 9/2008 | Huang et al. |
| 2008/0228555 | A1* | 9/2008 | Penke .................... G06Q 10/10 |
| | | | 705/12 |
| 2009/0112892 | A1 | 4/2009 | Cardie et al. |
| 2010/0121849 | A1* | 5/2010 | Goeldi .................. G06Q 30/00 |
| | | | 707/E17.108 |
| 2010/0145940 | A1 | 6/2010 | Chen et al. |
| 2011/0078167 | A1 | 3/2011 | Sundaresan et al. |
| 2014/0012863 | A1 | 1/2014 | Sundaresan et al. |
| 2017/0068667 | A1 | 3/2017 | Sundaresan et al. |

OTHER PUBLICATIONS

Kawai, Using a Sentiment Map for Visualizing Credibility of News Sites on the Web, pp. 53-58 (Year: 2008).*
Applicant-Initiated Interview Summary received for U.S. Appl. No. 12/568,583, mailed on Aug. 7, 2012, 3 pages.
Applicant-Initiated Interview Summary received for U.S. Appl. No. 12/568,583, mailed on Apr. 19, 2013, 3 pages.
Final Office Action received for U.S. Appl. No. 12/568,583, mailed on Apr. 12, 2012, 22 pages.
Final Office Action received for U.S. Appl. No. 12/568,583, mailed on Feb. 11, 2013, 18 pages.
Non-Final Office Action received for U.S. Appl. No. 12/568,583, mailed on Aug. 30, 2012, 18 pages.
Non-Final Office Action received for U.S. Appl. No. 12/568,583, mailed on Oct. 12, 2011, 16 pages.
Notice of Allowance received for U.S. Appl. No. 12/568,583, mailed on May 8, 2013, 8 pages.
Response to Final Office Action filed on Apr. 18, 2013, for U.S. Appl. No. 12/568,583, mailed on Feb. 11, 2013, 13 pages.
Response to Final Office Action filed on Aug. 13, 2012, for U.S. Appl. No. 12/568,583, mailed on Apr. 12, 2012, 14 pages.
Response to Non-Final Office Action filed on Jan. 11, 2012, for U.S. Appl. No. 12/568,583, mailed on Oct. 12, 2011, 10 pages.
Response to Non-Final Office Action filed on Dec. 31, 2012, for U.S. Appl. No. 12/568,583, mailed on Aug. 30, 2012, 17 pages.
Final Office Action received for U.S. Appl. No. 14/020,421, mailed on Aug. 24, 2015, 35 pages.
Non-Final Office Action received for U.S. Appl. No. 14/020,421, mailed on Apr. 20, 2016, 13 pages.
Non-Final Office Action received for U.S. Appl. No. 14/020,421, mailed on Dec. 23, 2014, 24 pages.
Notice of Allowance received for U.S. Appl. No. 14/020,421, mailed on Aug. 3, 2016, 7 pages.
Preliminary Amendment filed for U.S. Appl. No. 14/020,421, on Sep. 30, 2013, 9 pages.
Response to Final Office Action filed on Jan. 25, 2016, for U.S. Appl. No. 14/020,421, mailed on Aug. 24, 2015, 23 pages.
Response to Non-Final Office Action filed on Jul. 20, 2016, for U.S. Appl. No. 14/020,421, mailed on Apr. 20, 2016, 12 pages.
Response to Non-Final Office Action filed on May 26, 2015, for U.S. Appl. No. 14/020,421, mailed on Dec. 23, 2014, 21 pages.
Zhou, et al., "Ontology-Supported Polarity Mining", Journal of the American Society for Information Science and Technology, © 2007 Wiley Periodicals, Inc., Oct. 10, 2007, 13 pages.
Zhang, et al., "Narrative Text Classification for Automatic Key Phrase Extraction in Web Document Corpora", Copyright 2005 ACM, Nov. 5, 2005, 8 pages.
Wilson, et al., "Recognizing Contextual Polarity in Phrase-Level Sentiment Analysis", Oct. 6-8, 2005, 8 pages.
Mei, et al., "Topic Sentiment Mixture: Modeling Facets and Opinions in Weblogs", May 8-12, 2007, 10 pages.
Ku, et al., "Opinion Extraction, Summarization and Tracking in News and Blog Corpora", Copyright © 2006 American Association for Artificial Intelligence, Jan. 2006, 8 pages.
Kennedy, et al., "Sentiment Classification of Movie and Product Reviews Using Contextual Valence Shifters", University of Ottawa, Ottawa, vol. 22, No. 2, May 18, 2006, 14 pages.
Hu, et al., "Mining Opinion Features in Customer Reviews", Copyright © 2004, American Association for Artificial Intelligence, 2004, 6 pages.
Choi, et al., "Identifying Sources of Opinions with Conditional Random Fields and Extraction Patterns", 2005, 8 pages.
First Action Interview received for U.S. Appl. No. 15/357,018, mailed on Jan. 17, 2018, 7 pages.
Non-Final Office Action received for U.S. Appl. No. 15/357,018, mailed on Jul. 6, 2018, 8 pages.
Non-Final Office Action received for U.S. Appl. No. 15/357,018, malled on Oct. 26, 2018, 13 pages.
Notice of Allowance received for U.S. Appl. No. 15/357,018, mailed on Feb. 15, 2019, 8 pages.
Pre-Interview First Office Action received for U.S. Appl. No. 15/357,018, mailed on Nov. 2, 2017, 5 pages.
Preliminary Amendment filed for U.S. Appl. No. 15/357,018, on Jan. 12, 2017, 6 pages.
Response to First Action Interview-Office Action Summary filed on May 14, 2018, for U.S. Appl. No. 15/357,018, mailed on Jan. 17, 2018, 11 pages.
Response to Non-Final Office Action filed on Jan. 24, 2019, for U.S. Appl. No. 15/357,018, mailed on Oct. 26, 2018, 12 pages.
Response to Non-Final Office Action filed on Oct. 8, 2018, for U.S. Appl. No. 15/357,018, mailed on Jul. 6, 2018, 11 pages.
Response to Pre-Interview Communication filed on Dec. 29, 2017, for U.S. Appl. No. 15/357,018, mailed on Nov. 2, 2017, 2 pages.

* cited by examiner

```
<PTN positive="P" negative="N" neutral="U" negative="N" negation="NT" topic="TPC" gap="GP">
-1 TPC GP_0_3 NT work
-1 (can|should) GP_0_3 NT GP_0_3 U_VB
-1 (cannot|cannt|shouldnot|shouldnt) GP_0_3 U_VB
-1 NT way to U_VB
-1 please do NT
-1 please (donot|dont)
-1 please NT do
-1 NT GP_0_3 do GP_0_20 ((at all)|again|(any more)|anymore|(any long)|anylonger)
-1 NT (want|think|use|need|believe|get|(make sense))
-1 NT GP_0_5 enough
1 (get|bring|give|put|change) GP_0_3 TPC GP_0_3 back
1 (get|bring|give|put|change) GP_0_3 back GP_0_3 TPC
</PTN>
```

FIG. 11

SYSTEM AND METHOD FOR TOPIC EXTRACTION AND OPINION MINING

CROSS REFERENCE TO RELATED APPLICATIONS

This application is a continuation of and claims the benefit of priority to U.S. patent application Ser. No. 15/357,018, filed Nov. 21, 2016, which is a continuation of and claims the benefit of priority to U.S. application Ser. No. 12/568,583, now U.S. Pat. No. 8,533,208, filed on Sep. 28, 2009, and to U.S. patent application Ser. No. 14/020,421, filed on Sep. 6, 2013, each of which are hereby incorporated by reference herein in their entirety.

BACKGROUND

Electronic transactions provides a convenient mechanism for sellers and buyers to transact business. Communications related to such services may be received from users by way of a community forum or other feedback mechanism, and are recorded and stored in databases and session logs. This information is accessed to determine the performance of products and advertisements, as well as the performance of sellers.

BRIEF DESCRIPTION OF THE DRAWINGS

FIG. 11 illustrates computer code to implement a topic extraction and sentiment analysis method, according to an example embodiment.

DETAILED DESCRIPTION

Figure 1:
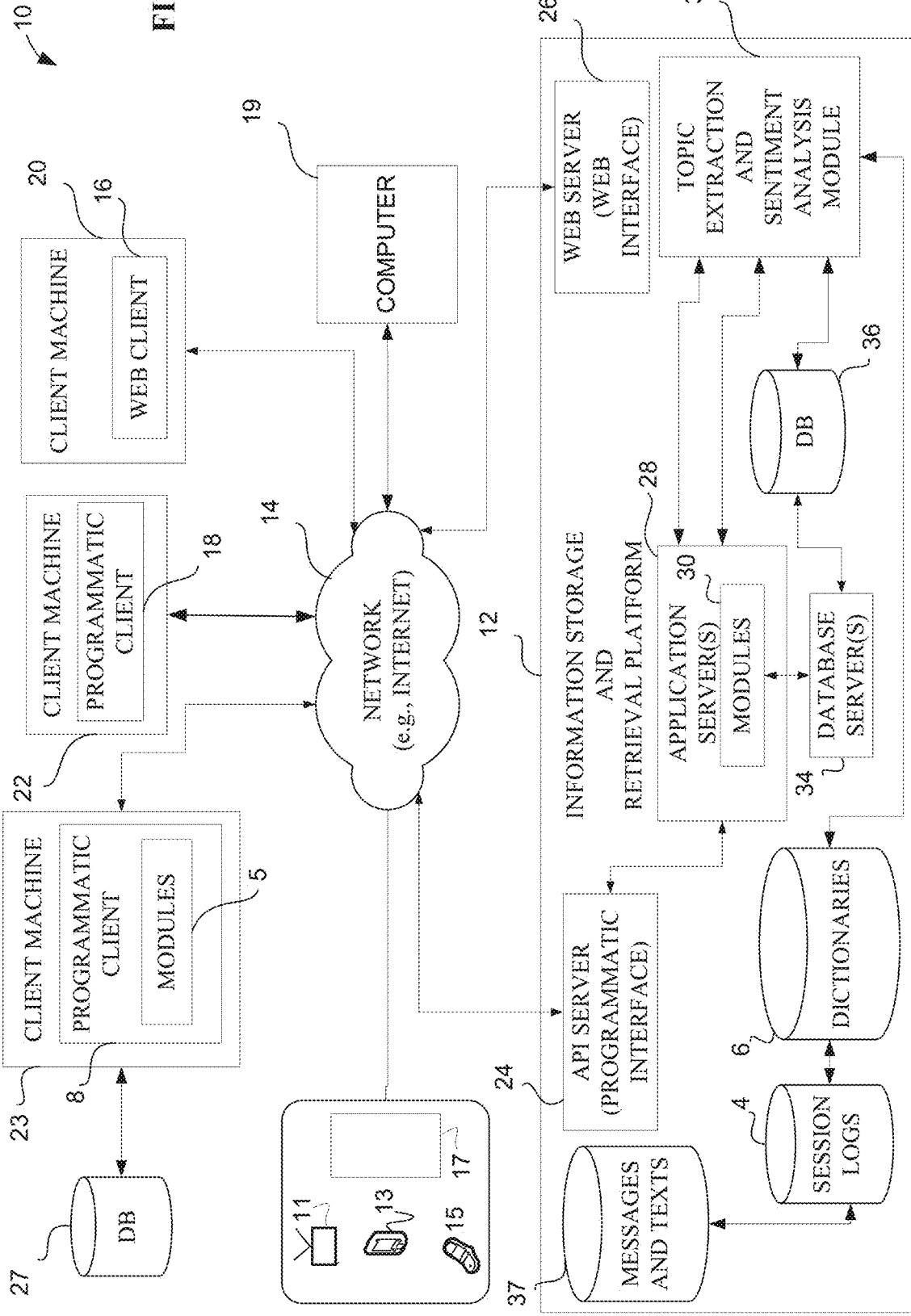
FIGS. 1 and 2 are block diagrams illustrating a system having a client-server architecture to provide services and facilitate communications, according to an example embodiment.

In the following description, for purposes of explanation, numerous specific details are set forth in order to provide a thorough understanding of some example embodiments. It may be evident, however, to one of ordinary skill in the art that embodiments of the invention may be practiced without these specific details.

For services offered through a networked communication system, such as an on-line service offered over the Internet, suppliers of products and services coordinate with consumers. Users of the system often provide comments and feedback, which is then available to buyers, sellers, and others. Often information relating to a product, service or participant is entered in feedback and community forums, and includes significant information related to sentiment polarity and opinion. Comments related to a specific topic may be entered as comments in multiple forums, venues or locations. For example, comments relating to a digital camera may be entered in a community forum related to photography, a community forum related to electronics, a review database for a seller, a product review section, and others. When seeking information related to the digital camera, a user may be presented with a multitude of reviews, comments, notes and so forth, requiring the user to manually scan through and read the individual reviews. This may become burdensome with the popularity of a product.

Sellers, marketers and others seek feedback and customer opinion as to products and services. Potential buyers also seek this information. In practice, many of these community forums receive a great volume of entries, making identification of desired information difficult, as a search of these entries requires the user to manually read through the comments and messages.

The following description details methods for topic extraction and opinion mining in an electronic system, including the application of polarity detection to identify words and phrases most likely related to sentiment, and further to apply lexical patterns to such words and phrases to understand the use of the polarity words and phrases so as to evaluate the significance of comments related to a product, service, participant or market. The communications may include comments on a community forum or feedback board, comments solicited from users of a service or product, or selections made on a questionnaire. The communications may convey opinion or sentiment of a user. The processes discussed herein extract the opinion and sentiment information automatically, avoiding manual searching of the communications.

The information is then presented in a format for users to evaluate and may be implemented into a decision making process. In one example, the resultant information is presented graphically to identify trends. The information may further be used to generate ratios of positive feedback to negative feedback. In some examples, the information is automatically evaluated and presented to a requester as an alarm or indicator when the resultant information satisfies specified criteria. In some examples the resultant information is compared to information related to other queries, such as to compare results for one product against results for a similar or competing product.

In one embodiment, a topic and opinion mining method is determined from multiple community boards. The method may include techniques for feature extraction, such as Latent Dirichlet Allocation (LDA), to extract topics from user community boards. The topics are identified by key words and phrases, which are then classified as positive or negative comments. The method then analyzes the classified information to identify and confirm sentiment information in an automatic manner. Such a method discovers topics from diverse opinion pages and classifies the topics using business judgment to identify polarity of the comments in the text including key phrases as well as the community reaction to product launches, and other initiatives.

In an example embodiment, a system includes two main components: i) topic extraction; and ii) opinion mining, wherein topic extraction includes a first phase to extract key phrases from texts and documents in the community forum or other venue and a second phase of opinion mining to analyze the sentiment of sentences including the key phrases, and wherein the opinion mining includes syntactical analysis and lexical pattern matching. The topics may be ranked to identify essential topics. Automatic identification of essential topics in a given document corpus is a challenging task as words may be used in various contexts, and the corpus is a large set of texts or documents which are used to perform statistical analysis.

In one embodiment, a natural language process is used to identify key phrases related to the topic of interest among the various documents. Further, such processing may apply a machine learning method to extract key phrases covered in the discussion posts and other documents. Once a group of essential ranking documents is identified, the method applies a clustering technique to the group of documents, which infers a relationship(s) among topics that belong to that group.

One example embodiment of a distributed network implementing image recognition services for identifying data items stored in an information resource is illustrated in the network diagram of FIG. 1, which is a block diagram illustrating a system 10 having a client-server architecture and for providing image services, according to an example embodiment. Within system 10, a commerce platform or commerce server includes an information storage and retrieval platform 12, which provides server-side functionality, via a network 14 (e.g., the Internet) to one or more clients. As illustrated, system 10 interacts with a web client 16 executing on a client machine 20, a programmatic client 18 executing on a client machine 22, and a programmatic client 8 in the form of modules 5 executing on a client machine 23. In one embodiment, the web client 16 comprises a web browser, but may employ other types of web services.

An electronic commerce service may run from one or multiple of the client machines, such as 20, 22 and 23, which may be provided at a common location or a variety of separate locations. Service providers and users may interface with the topic extraction and sentiment analysis module 32, which accesses information stored in a database 36, messages and texts 37, session logs 4, and dictionaries 6 within information storage and retrieval platform 12. The session logs 4 include listings of information from user sessions interacting with a service or product. The session logs 4 may organize the information so as to coordinate this information with the messages and texts 37. For example, when a message or comment includes text relating to a digital camera, the corresponding session logs may provide information relating to the specific digital camera purchased, the software purchased, or other information which may be used to better understand the comment. The messages and texts 37 may include the full text of the messages or may be a summary of information submitted in response to a questionnaire. The dictionaries 6 may include a variety of information, including polarity dictionaries to identify words and phrases related to sentiment and opinion, such as "good" or "poor." The dictionaries 6 may include lexical information dictionaries, and other resources used for topic extraction and sentiment analysis.

Within the information storage and retrieval platform 12, Application Program Interface (API) server 24 and web server 26 are coupled to, and provide programmatic and web interface to, one or more application servers 28. Application servers 28 host one or more modules 30 (e.g., applications, engines, etc.), further detailed in FIG. 2. Application servers 28 are, in turn, illustrated as coupled to one or more database servers 34 that facilitate access to one or more databases 36. Modules 30 provide a number of information storage and retrieval functions and services to users accessing the information storage and retrieval platform 12. A user accesses information storage and retrieval platform 12 through network 14 such as from a computing device.

While system 10 of FIG. 1 employs a client-server architecture, the present disclosure is not limited to this architecture, and could be applied to a distributed, or peer-to-peer architecture system. The various modules 30 may also be implemented as stand-alone software programs, which do not necessarily have networking capabilities.

The web client 16 may access the various modules 30 via a web interface supported by web server 26. Web server 26 allows developers to build web pages. In one embodiment, web server 26 may be used in collaboration with JAVA® technologies by Sun Microsystems of Menlo Park, CA, and with Ajax (Asynchronous JavaScript and XML) technologies, which comprises a collection of technologies enabling the creation of web applications. Ajax uses JavaScript, eXtensible Markup Language (XML), and Cascading Style Sheet (CSS) formatting, along with other technologies. Ajax allows programmers to refresh certain parts of a web page without having to completely reload the page. By obtaining information dynamically, web pages load faster, respond more quickly to requests, and are more functional. Developers consider using Ajax applications, and Ajax-like applications, when seeking to reduce network latency in certain applications.

Similarly, programmatic client 18 accesses various services and functions provided by the modules 30 via the programmatic interface provided by the API server 24. In one example, programmatic client 18 comprises a seller application (e.g., the TURBOLISTER® application developed by eBay Inc., of San Jose, CA) enabling sellers to author and manage data item listings, such as where each listing corresponds to a product or products, on information storage and retrieval platform 12. Listings may be authored and modified in an off-line manner such as when a client machine 20, 22, or 23 is not necessarily connected to information storage and retrieval platform 12. Client machines 20, 22 and 23 are further to perform batch-mode communications between programmatic clients 18 and 25 and information storage and retrieval platform 12. In addition, programmatic client 18 and web client 16 may include authoring modules (not shown) to author, generate, analyze, and publish categorization rules used in information storage and retrieval platform 12 to structure data items and transform queries. In one example embodiment transforming queries uses a data dictionary with token pairs to expand a narrow keyword or to focus a broad keyword. The client machine 23 is coupled to one or more databases 27. The databases 27 include information used by client machine 23 in implementing a service or operation and may include specific information for products or services offered by client machine 23.

Users having access to service(s) provided by client machine 23, for example, include users of computer 19 and users of wireless network 17, which may serve as a common access point to network 14 for a variety of wireless devices, including, among others, a cable-type television service 11, a Personal Digital Assistant (PDA) 13, and a cellular phone 15.

In one example, client machines 20, 22 and 23 offer services which store at least some information in the information and storage retrieval platform 12 to enable web services. The services may provide users with a mechanism to provide feedback and other information to the service by way of community forums, feedback board, or other entries. The information received from users may be stored in a database, such as a messages and texts 37 within the information storage and retrieval platform 12.

In some embodiment, a catalog of web services comprises information stored in the information storage and retrieval platform 12. Client machine 23 stores information related to use of the web services in databases 27, wherein the information may be used to identify associated services and offerings. The associated services and offerings are also listed in the catalog of web services. Descriptors of the associated services and offerings may be used to generate and modify a vocabulary for a data dictionary corresponding to the catalog of web services, such that a user search having keywords related to a first service may return results for a second service associated with the first service. Additionally, each of client machines 20, 22 and 23 may also be users that search data items in information storage and retrieval platform 12.

In another example, client machine 23 may be a data processing client offering products to customers via network 14. Client machine 23 stores a catalog of products in information storage and retrieval platform 12, with the catalog of products having a corresponding data dictionary. Client machine 23 stores information related to at least one product in databases 27 or dictionaries 6. The information may also include frequency of searches, resultant sales, related products, pricing information, and other information related to customer use of the data processing service. Additionally, databases 27 may store other product-related information, such as style, color, format, and so forth. Client machine 23 may use the information stored in databases 27 to develop descriptor information for at least one product and to determine the popularity or sentiment related to the product. Similarly, a service provider or seller may use the sentiment information to develop advertising and marketing information. The sentiment information may be used to automatically enhance the service provider's business and electronic service. Product descriptors and other product information may be used to generate and modify a vocabulary for a data dictionary corresponding to the catalog of products, such that a user search having keywords related to a first product may return results for a second product associated with the first service. In other embodiments, a client machine, such as client machines 23, 22 and 20, may store information in the information and storage retrieval platform 12 related to business processes, or other applications which store data in a database which may be accessed by multiple users.

Figure 2:
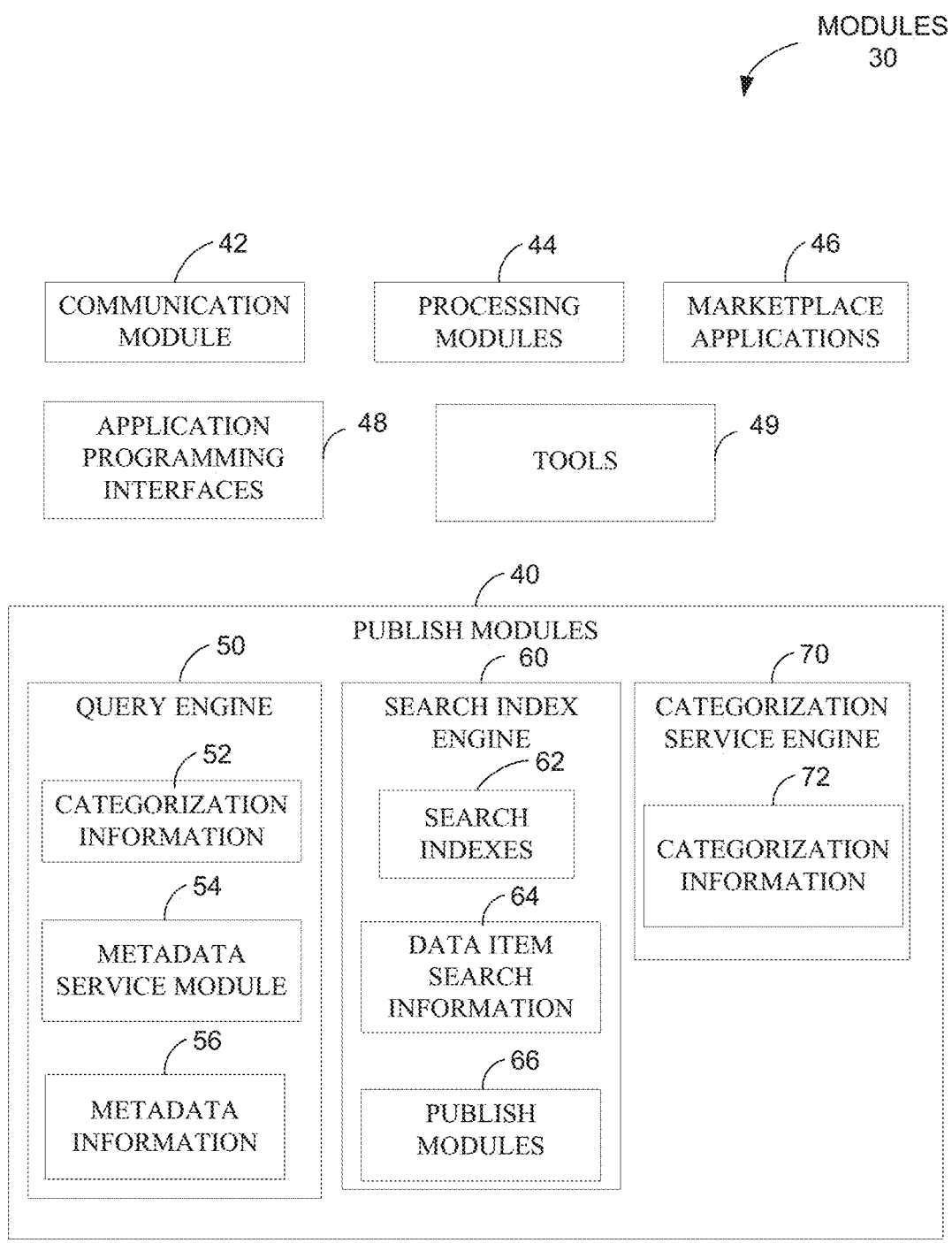

Continuing with system 10 of FIG. 1, information storage and retrieval platform 12 includes modules 30 within application server(s) 28, wherein modules 30 are further detailed in FIG. 2. Similar to the illustration of FIG. 1, FIG. 2 is a block diagram illustrating modules 30 within system 10 according to an example embodiment. The modules 30 may include software modules or the functionality of a module implemented at least partially in software. The software may be developed using a programming language, such as JAVA, which is an object-oriented programming language developed by Sun Microsystems. Other languages and development tools may be used according to the design and purpose and at the discretion of the system developer.

Modules 30 are to receive images and other information from entities within system 10, such as through network 14 (see FIG. 1). Further modules 30 comprises a communication module 21, to receive, process and transmit messages according to one or multiple communication protocols. Processing modules 44 are used to process requests and interface with the various modules and functions of the information storage and retrieval platform 12. Similarly, marketplace applications 46, and APIs 48 are used to interface for various services within the system 10. The ecommerce service may further publish information using the publish modules 40 including a query engine 50, a search index engine 60 and a categorization service engine 70. A service provider or user may incorporate the information available through the publish modules 40 to enhance topic extraction, such as to identify keywords and phrases related to a product or service. Still further, the sentiment analysis may incorporate the publish modules 40 to better understand comments and text related to services and products.

The query engine 50 includes categorization information 52, a metadata service module 54, and metadata information 56, which stores the metadata information. The search index engine 60 includes search indexes 62, data item search information 64, and publish modules 66. The categorization service engine 70 includes the categorization information 72.

The tools 49 provide developer tools and software for building applications, such as to expand or enhance the image processing capabilities. In one example, tools 49 include Java servlets or other programs to run on a server. As the present example implements Java tools, some terms used with respect to Java applications and tools are detailed. A Java applet is a small program sent as a separate file along with an HTML communication, such as a web page. Java applets are often intended to run on a client machine and enable services. Java applet services, for example, may perform calculations, position an image in response to user interaction, process data, and so forth.

Figure 3:
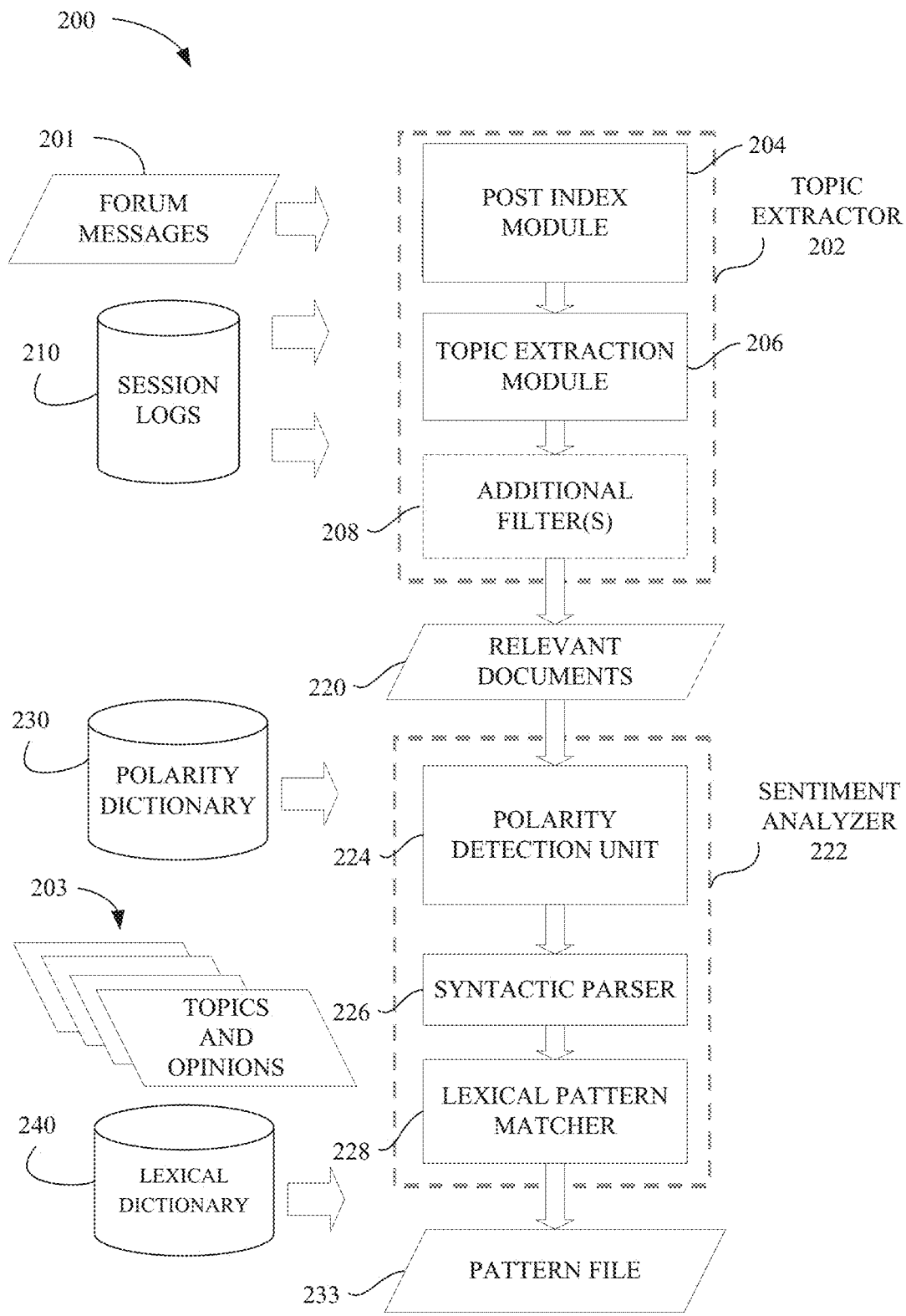
FIG. 3 is a block diagram illustrating a system and apparatus to implement topic extraction and sentiment analysis of communications within a system as illustrated in FIG. 1, according to an example embodiment.

As illustrated in FIG. 1, the information storage and retrieval platform 12 further includes a topic extraction and sentiment analysis module 32, which in one embodiment includes instructions for executing a method for identifying topics in texts and documents to determine opinions and sentiment related to products and services. The topic extraction and sentiment analysis module 32 of FIG. 1 may further be described as in FIG. 3, which is a block diagram illustrating a system 200 and apparatus for implementing a topic extraction method, according to an example embodiment. The system 200 extracts topic information by identifying key phrases in documents and other texts, and then ranks the key phrases according to import of the key phrases in identifying sentiment or opinion in the document or text. Finally, the system clusters or groups documents so as to infer relationships among topics belonging to each group.

The target of topic extraction is a set of documents within a given set or corpus. A document as used herein refers to information in a textual form, such as comments submitted to a community forum. Service providers may provide a forum or board which allows postings of comments, feedback, questions and other information. A topic is a concept, expressed either in single words or multi-word phrases, representing a concept or idea for a set of documents. In some examples the topic may represent ideas substantially related to the documents, such as to the content of the documents, type of documents, or title of documents. In one example, "Nikon D420" is a topic that represents documents which discuss Nikon D420 digital cameras. In some embodiments, documents may include entries submitted to a community thrum, emails provided with respect to a topic, and other information available and related to a topic. Other information may include forum posts, comments, feedback, user emails, blog entries, question and answer entries, and so forth. The system 200 identifies information related to a specific topic, such as a digital camera, and from this information determines opinions and other sentiment related to the topic. The topic may be broadly defined, and may include multiple subtopics. The topics may be computed and selected using a combination of multiple methods, including Term Frequency-Inverse Document Frequency (TFIDF), Mutual Information (MI), Latent Dirichlet Allocation (LDA) and others. The topics identified are then stored in a database table for further use.

As illustrated, a variety of thrum documents 201 are provided as inputs to the topic extractor 202, which includes a post index module 204, a topic extraction module 206 and optional additional filters 208. Session logs 210 may also provide documents containing messages related to a specific topic. The text extractor outputs relevant documents, e.g., documents relevant to the topic. The relevant documents are then provided to the sentiment analyzer 222. The relevant documents may include the complete documents or may be sentences or portions of text from the documents which include key phrases related to the topic. The post index module 204 is used to index and organize the various documents within a community forum or other document corpus. The organization puts the documents in an order to facilitate searching and other analysis. The post index module 204 records and indexes the number of each post or document for topic-document reference and retrieval. The post index module 204 outputs an index that contains a mapping of each post number to all constituent word IDs and an inverted index of each individual word to membership post numbers.

The topic extraction module 206 then receives the indexed documents and searches to identify key phrases within the documents. Additional filters 208 may use heuristic or other information to identify the relevant documents and messages, for example a filter may be used to extract sentences or longer phrases from the documents. The relevant documents 220 are then output from the topic extractor, wherein the relevant documents 220 may be identified as complete documents, or may be portions of documents. In some embodiments, each of the relevant documents 220 includes an identifier of the specific community forum or venue of which the relevant document 220 was part. Operation of the various modules of the topic extractor 202 is provided in the flow diagram of FIG. 4. The relevant documents 202 may be a list of documents to identify an access location. Similarly, the relevant documents 202 may store the relevant portions of documents related to the topic.

The text from the relevant documents 220 are then processed by the sentiment analyzer 222 to evaluate the words, sentences, and phrases that include sentiment indicators which allows the words, sentences, and phrases be classified as "positive" or "negative" sentiment. The resultant classification is used to understand opinions and expressions of sentiment about the topic. To this end, a polarity dictionary 230 may be used to identify specific polarity words, such as "good" or "horrible." The sentiment analyzer 222 includes a polarity detection unit 224, used with the polarity dictionary 230, to identify key phrases which indicate a sentiment or opinion. In one example the polarity identifies positive or negative comments. However, in some embodiments, other sentiments may be identified as well, such as informational comments. For example, an informational comment may include feedback from users as to the type of photographs taken with a particular digital camera.

Other types of comments may be identified as well, wherein a dictionary of words associated with the classification criterion are stored. The polarity detection unit 224 identifies positive and negative comments using a polarity word dictionary 230, and then provides those documents containing the positive or negative comments.

A syntactic parser 226 receives the polarity information from the polarity detection unit 224, and applies a syntactic parsing operation to the received information. The syntactic parser 226 may be used to build syntactic tree of a sentence or portion of text, and may apply heuristic rules to identify or filter particular portions of the sentence or portion of text. The syntactic parser 226 receives the text that must be analyzed as a set of sentences or strings. It mainly includes word tokenization, part of speech tagging and phrase chunking and phrase relation recognition components. Finally, a sentence is represented as a syntactic tree structure. The results from the syntactic parser 226 are applied to a lexical pattern matcher 228. The sentiment analyzer 222, and modules therein, may access information stored in files relating to the topic, such as a file 203 of topics and opinions. The polarity detection unit 224 further uses information from a lexical dictionary 240, which includes terms organized and grouped according to relationships of synonyms and so forth. Operation of the sentiment analyzer 222 is detailed in FIG. 5. The polarity detection unit 224 uses a lexical dictionary containing a set of words with an associated integer (+) or (−) representing its polarity. A sentiment expression may be a combination between polarity words and lexical words. For example, the lexical words, "anymore," "at all," "again," "any longer" may show negative meaning when following "not do . . . ," although they are not necessarily polarity words. So we will group these synonyms and generate one pattern.

Figure 4:
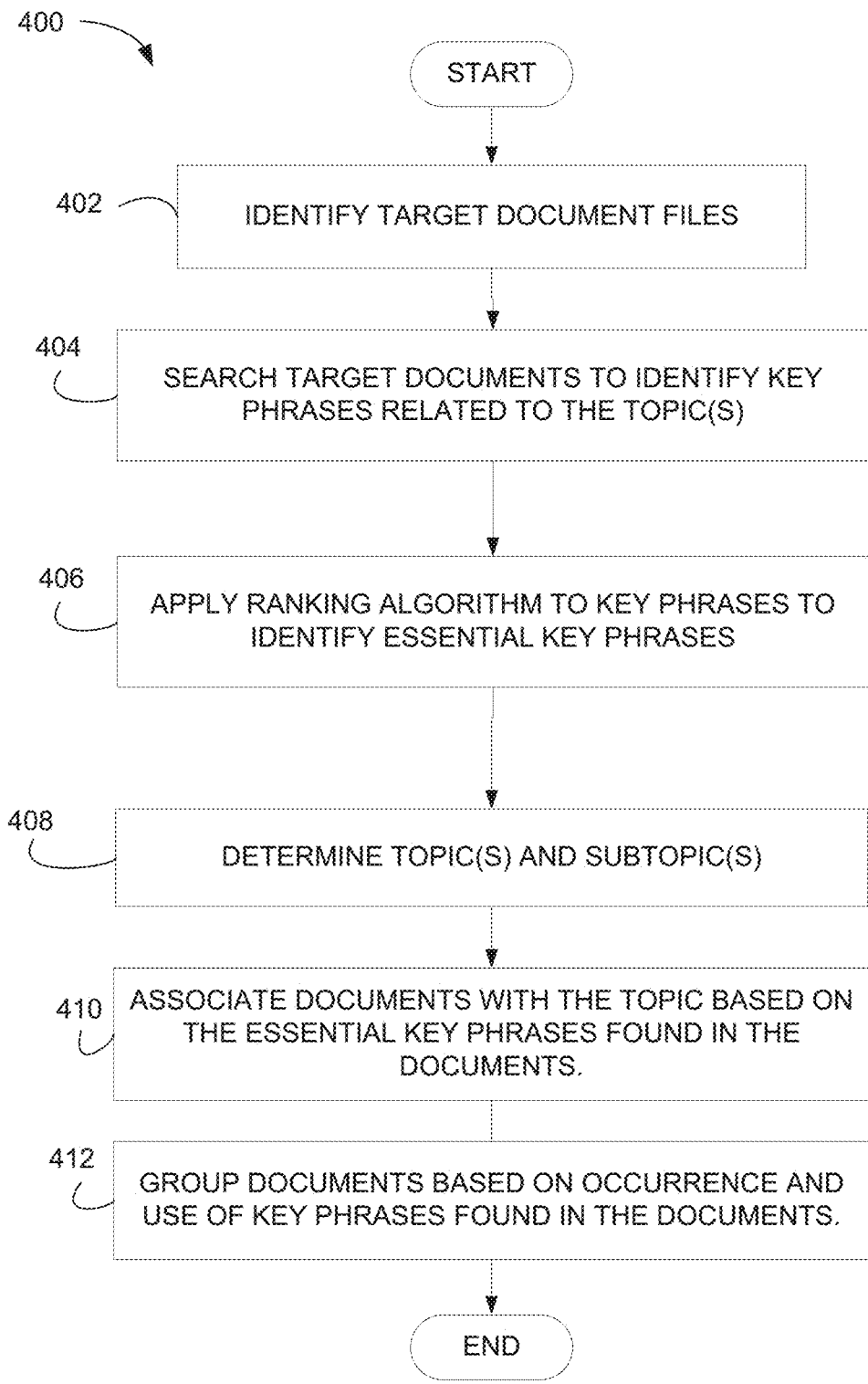
FIGS. 4, 5 and 6 illustrate, in flow diagram form, topic extraction and sentiment analysis, according to an example embodiment.

FIG. 4 is a flow diagram illustrating operation 400 of the topic extractor 202 starting by identifying target document files at operation 402. The documents may be specified as related to a product, service, issue, or other subject. The documents may be selected by a seller in order to retrieve feedback and opinion information related to a product or service they are selling, or a feature of their business, such as response to a new website feature, and so forth. The documents may be input into the system 200 by way of a field in a user interface, or may be selected from a list. The documents may include community forums and document venues which may be used to search for opinion information. A topic extractor 202 continues to search the group of documents to identify key phrases within the text of the group of documents at operation 404. In some embodiments, the process also identifies key phrases or other information associated with the document, such as metadata which may be used to classify and identify the source of each document and so forth. Phrase extraction, such as for bigrams or phrases based on textual patterns, is applied before the topic extraction phrase so they can be provided as input to the LDA topic extraction algorithm.

In one embodiment, automatic key phrase extraction provides a tool for identifying key words and phrases used in community forum entries, emails, and other documents related to a topic. Key phrases are linguistic descriptors of textual content of documents and Key Phrase Extraction (KEA) is implemented to retrieve phrases from documents. In some embodiments, the KEA method includes a natural language processing tool to find noun phrases and verb phrases automatically. In many text-related applications techniques for clustering and summarization also may be used to identify phrases indicating a sentiment. A data mining or machine learning tool may be used to find multi-word phrases or other parts of a text. A KEA process may include two stages, a first stage which builds a model based on training documents and a second stage uses that model to predict the likelihood of each phrase in the new given document. The first stage may include manually authored key phrases, such as those submitted by a user looking for specific words or phrases. In one example, the system enables selection of a multi-word concept, such as "dropped calls."

Continuing with FIG. 4, the text extractor 202 is further to apply a ranking algorithm to key phrases to identify essential key phrases at operation 406. In some embodiments, the ranking is done by Term Frequency-Inverse Document Frequency (TF-IDF) techniques where a weight is used to evaluate the importance, significance or relevance of a word or phrase. A TF-IDF weight is a statistical measure used in information retrieval and text mining. The TF-IDF weight indicates how important a word is within a document in a collection or corpus. In some embodiments, the importance increases proportionally to the number of times a word appears in a given document, which may be weighted against the frequency of the word in the corpus. Some embodiments implement a ranking function that is computed as a function of the TF-IDF weights. Additionally, the KEA method may consider the first appearance of a word or phrase in a text, such as the normalized distance of the first appearance of a word to the beginning of the text. The KEA method is used to determine the lexical units in the text before the topic extraction. In some embodiments, an LDA process may then be used to generate topics.

According to some embodiments, the phrases generated from the various KEA methods are ranked as a function of weights applied by at least one KEA method. The phrase rankings are evaluated with respect to a threshold, those phases having ranks that exceed the threshold are considered essential topics, at operation 408. The KEA based methods may be used to generate key phrases and use this as input for LDA to improve the grouping result. The list of essential topics is further extended to identify associated sub-topics. In one example, the topics "new search system" and "new search engine" are identified as subtopics of the "new search" topic.

Once the list of topics and subtopics are identified, the process associates documents with corresponding topics at operation 410. For a given topic, those documents in which the topic (e.g., essential key phrase) appears are simply grouped together.

Various methods may be used to extend a document grouping, e.g., those documents to which the topic is highly related are also grouped. Moreover, relationships may be extracted among topics that belong to the same group. In a second stage, the KEA method then uses a model to predict the likelihood of each phrase in a new given document. Some examples use a KEA method first to extract important phrases, and then use an LDA method incorporating the KEA results to improve the LDA results by selecting good candidates for grouping at the very beginning.

The documents are then associated with the topic(s) based on the essential key phrases found in the documents at operation 410 and grouped at operation 412 based on occurrence and use of key phrases found in the documents. The retrieved and grouped documents containing the essential keywords are provided as relevant documents 220 of FIG. 3.

In some embodiments, some embodiments also use other filtering techniques to identify and evaluate key phrases, including the use of heuristics in key phrase extraction, such as capitalization, identification of non-stopwords which are filtered out prior due to their common occurrence and other criteria, mutual information, and length or number of characters in a phrase. The mutual information is a quantity that measures the mutual dependence of two variables, two words in this context. In text mining it is used to extract multi-word phrases by identifying the words that appear together more often than by chance (word collocations) i.e "dropped calls".

Figure 5:
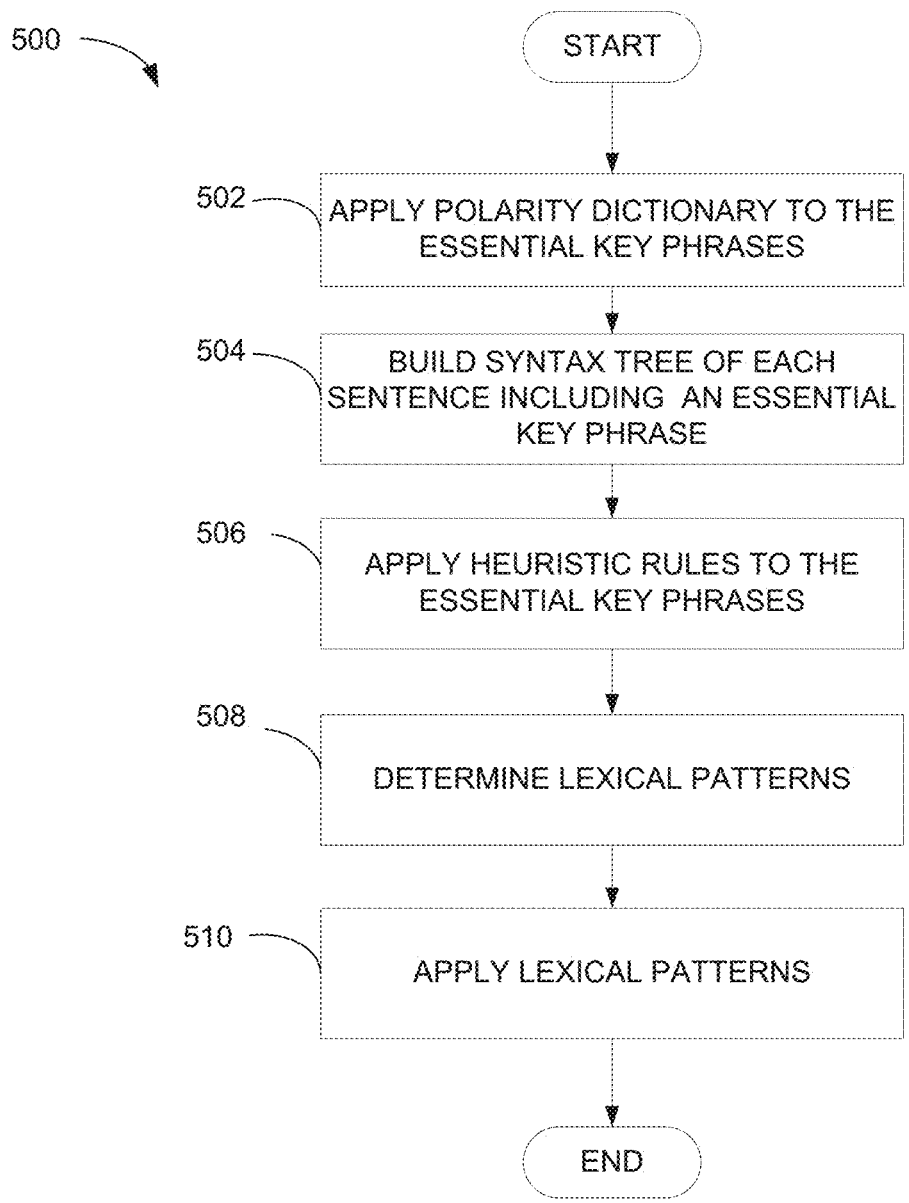

FIG. 5 illustrates operations of the sentiment analyzer 222 wherein a polarity dictionary 230 is used to identify words indicating sentiment in the essential key phrases at operation 502. In some embodiments the polarity dictionary 230 is used in collaboration with a lexical database of English, such as the WordNet® dictionary by the Trustees of Princeton University, Princeton, NJ Each word of a sentence is scanned over the polarity dictionary 230 and the lexical database 240 to mark polarity words and phrases.

The syntax analyzer 222 further builds a syntactic tree for each sentence of the relevant documents that includes an essential key phrase at operation 504. A syntax tree is a tree that represents the syntactic structure of a string according to a set of grammatical rules or norms. An example of a syntax tree includes multiple nodes identified as source nodes, leaf nodes or internal nodes, and terminal nodes. A parent node has a branch underneath the node, while a child node has at least one branch directly above the node. The relationships are thus defined by branches connecting the nodes. The tree structure shows the relationships among the various parts of a sentence.

Figure 6:
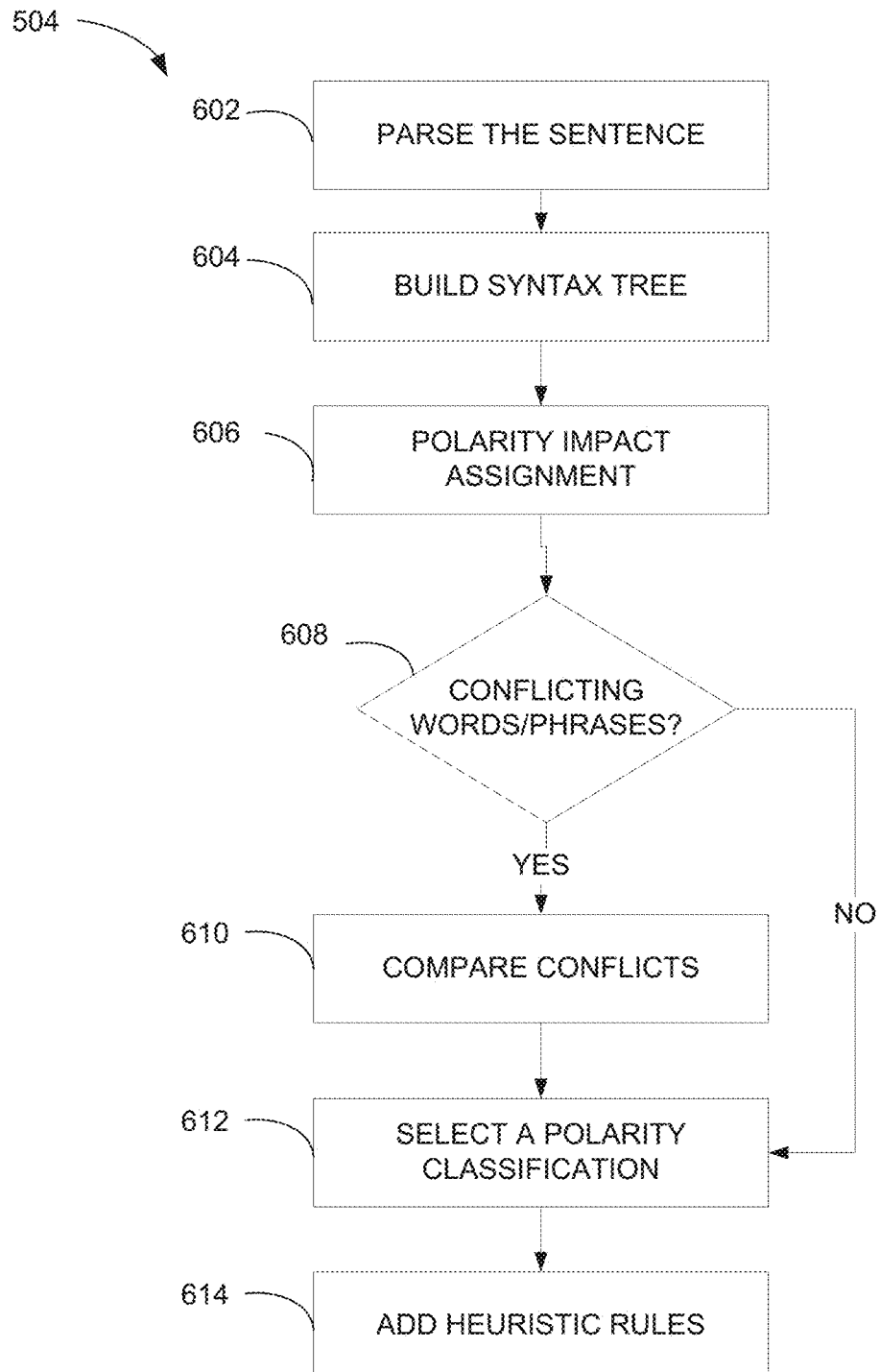

In an example embodiment, building a syntax tree, such as performed at operation 504, may incorporate a natural language parsing tool to obtain a syntactic tree of a target sentence. FIG. 6 further details operation 504, wherein operation 602 parses the sentence, which includes activities to tag parts-of-speech. The parsing may include detection of subjects and objects within the sentence, which information is used to better understand the use of words, terms, phrases and grammatical parts of the sentence structure. Additionally, parsing may involve detection of negation words, such as "nor," "not," and "no." For example, the negation words may include "no trust," "not trusted," and "nor trusted." The parsing may also include pronoun cross-reference, and other information as to sentence structure.

The parsing allows the syntax analyzer 222 to build a syntax treat operation 604, and assignment of polarity impact to individual words, phrases and terms at operation 606. For each of the polarity key phrases included in the sentence, the impact assignment is a score identifying the impact of each polarity key phrase. The impact assignment may be a factor which indicates how much impact the polarity word is on the given topic.

As an example, consider the sentence: "[The new search] is HORRIBLE!!! Please dedicate your resources to improving another function of your website." In this text, the there are two polarity words, "HORRIBLE" and "improving." These two polarity words are in conflict as first word has a negative meaning while the second word has a positive meaning. In this example, the word "horrible" is a stronger word and has more impact on the given topic. The stronger impact may also reflect a direct relation with the topic of "the new search." Therefore, the entire text is to be tagged as negative based on a comparison of the impact of the conflicting terms. The polarity impact assignment may be determined in a variety of ways. In one way, the polarity impact is considers the polarity word having a dominant impact on the topic, and then uses that word to determine the sentiment orientation of the topic. In another example, the polarity impact may be determined by a sum of polarities method. Using the sum of polarities method, the example text will be tagged as neutral. Positive words are assigned a +1 value and negative words are assigned a −1 value. The sum of the polarities method adds up the polarities of the words in a sentence. For each pair ($w_i$, $p_i$) in a sentence, where $w_i$ is a word and $p_i$ the corresponding polarity. The sum is therefore the sum of all pi in the sentence. The impact score may also be detected using the syntactic distance between the word and the topic in the syntactic tree. In other words, the number of branches from a polarity word back up to the topic key phrase determines the impact of the polarity word. Still another method may incorporate an impact score when adding up to all the polarity words.

At decision point 608 the syntactic analyzer 222 determines if there are any conflicting polarity words, and if so compares the polarity impact at operation 610. A polarity classification is made at operation 612, which may be positive, negative or neutral. Some embodiments have a variety of classifications indicating a degree of polarity.

At operation 614 heuristic rules are applied to the classified polarity words and the text. These rules may handle special situations and usage pattern, such as negation, enantiosis and questioning. Negation words are those that tend to be related to negative sentiment, such as "nobody," "null," "never," "neither," "nor," "rarely," "seldom," "hardly," and "without," in addition to the words given above. Following a negation word, if the polarity word is close to the negation word and there is no punctuation that separates the polarity word and the negation word, then the significance of the polarity word is reversed. For example, in one scheme the word "liked" is assigned a polarity value of +5, while the words "not liked" is assigned a reverse polarity of −5. In one example, the distance threshold is given as 5 words from the negation word to the polarity word.

Additionally, the heuristic rules may evaluate figures of speech, such as enantiosis, which affirmatively states a negation, or vice versa. In some examples, question sentences may be skipped, as the meaning is ambiguous. Consider the text "What is wrong with old. Boolean search?" for which the author's sentiment is not easily discerned. Further, some examples search for words in quotation marks, and skip those words as the meaning is ambiguous. Consider the example text "IMO, this "improvement" is utterly ludicrous." The meaning of the word "improvement" would typically be positive, however, in this context it is negative, and therefore, the process ignores the word. The heuristics for the topic extractor 202 are used to identify lexical units or phrases. These heuristics are used for sentiment analysis and may be expressed using a common format or language, such as rules and patterns.

Figure 7:
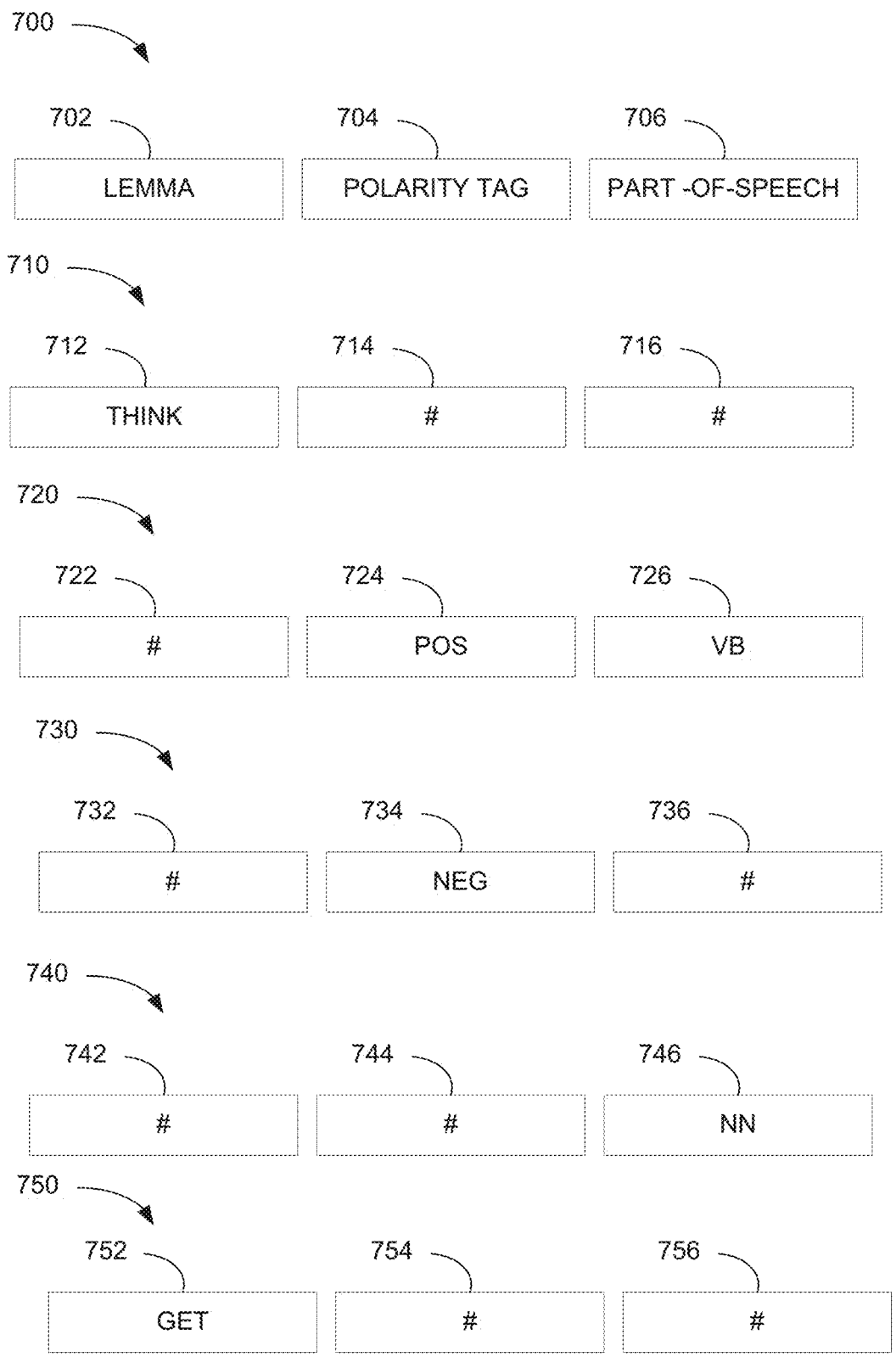
FIG. 7 illustrates tokens used to extract topics from texts, according to an example embodiment.

Continuing with FIG. 5, the method 500 further includes activities to determine lexical patterns at operation 508 and then apply the lexical patterns at operation 510. A lexical pattern is defined as a token sequence, where each individual token is an abstraction of a word. A token has three parts: a lemma of the word, a polarity tag and a part-of-speech tag. A lemma is a form of a word which identifies the word. The polarity tag identifies the word as having polarity significance. Examples are illustrated in FIG. 7, where a model of a polarity word token sequence is described by the token 700, including a lemma field 702, a polarity tag field 704 and a part-of-speech field 706. The polarity field 704 may identify the polarity as one of various possibilities: POS (possible), NEG (negative), NEU (neutral), and NOT (negation). The part-of-speech field 706 may include codes for the various parts-of-speech, such as NN for a noun, VB for a verb, JJ for an adjective, RB for an adverb, IN for a preposition, PRP for a possessive term, and CC for conjunction, and so forth.

In application, a wildcard may be implemented, such as to use "#." In a first example, a word is described by token 710, wherein the lemma field 712 has an entry of "think," and polarity and parts-of-speech fields 714 and 716 have wildcard entries, which means the token 710 will identify any text having the word "think" which is of any polarity and wherein the word "think" may be any part-of-speech.

In a next example, the token 720 includes a wildcard in lemma field 722, but identifies a positive polarity in polarity field 724, and a verb identifier in parts-of-speech field 726, meaning this token applies to any suitable positive verb In still another example, the token 730 includes wildcards for lemma and parts-of-speech fields 732 and 736, and a negative entry in lemma field 734, meaning this applies to any negative polarity words. The token 740 includes wildcard entries in lemma and polarity fields 742 and 744, and a noun identifier in parts-of-speech field 746, meaning this applies to any nouns. The token 750 includes wildcards in polarity and parts-of-speech fields 754 and 756, with an entry of the word "get" in lemma field 752, meaning this is one of the special words.

Figure 8:
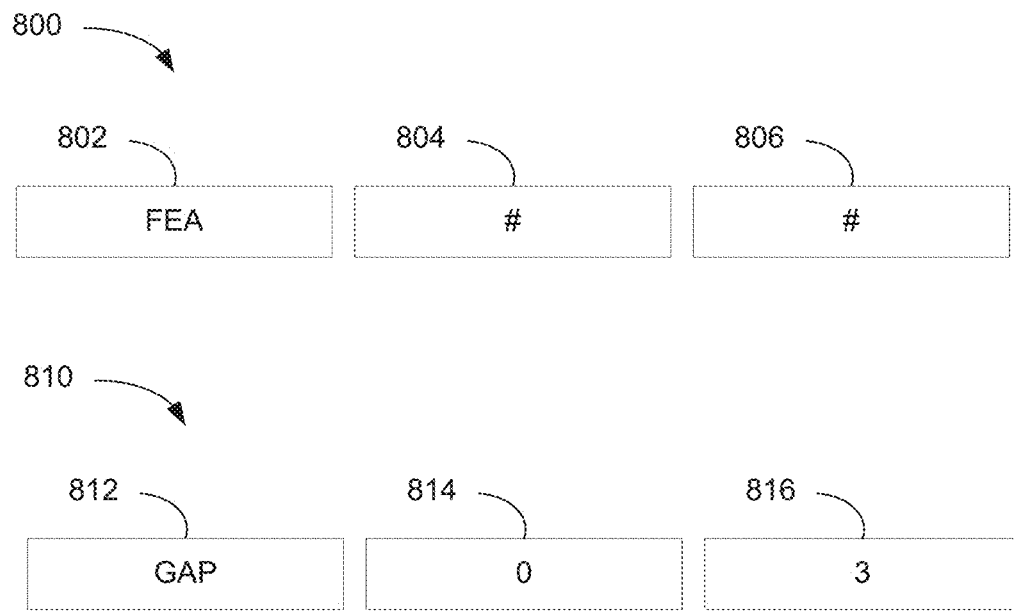
FIG. 8 illustrates special tokens to identify tasks used to extract topics from texts, according to an example embodiment.

Embodiments may include a variety of words to identify the parts-of-speech broadly, using fewer terms, or narrowly, using more terms. For example, the part-of-speech field 706 could include a code for a verb in past tense and a second code for a verb in present tense. Or the part-of-speech 706 could include a single code for all verbs. The syntax analyzer 222 may further implement special tokens, such as the feature token, or FEA identifying a topic and the gap token, or GAP, identifying a number of words that may be skipped between two tokens. Examples of special tokens are illustrated in FIG. 8.

The token 800 includes the special token FEA in first field 802 and wildcards in the polarity and parts-of-speech fields 804 and 806, meaning the topic or key phrase of any polarity and used as any part-of-speech. The token 810 has the special token GAP entered in field 812, a zero is entered in field 814 and a three (3) in field 816. The field 816 indicates that three words may be skipped between two tokens. Tokens 814 and 816 may be used to indicate that up to 3 words (0 to 3 words) may be skipped in between two tokens.

Figure 9:
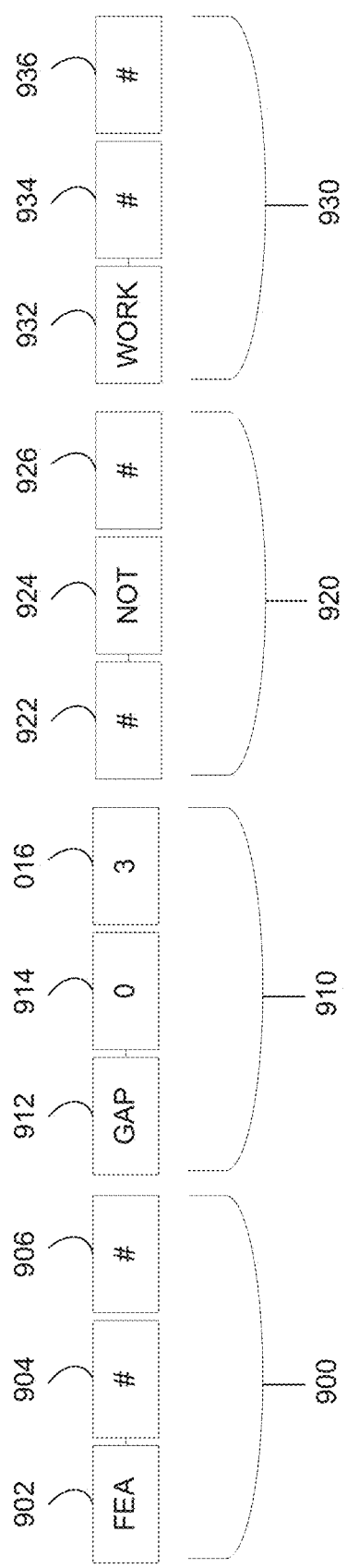
FIGS. 9 and 10 illustrate patterns formed by multiple tokens used to extract topics from texts, according to example embodiments.

FIG. 9 illustrates an example pattern having tokens 900, 910, 920 and 930. The token 900 includes a special token FEA in field 902, and wildcards in fields 904 and 906. The token 900 is to identify any text containing the topic or key phrase of any polarity and used as any part-of-speech. In one scenario, the key phrase is "the new search," and the token 900 will identify any text containing the key phrase "the new search." The token 912 includes a special token GAP in field 912. The tokens 914 and 916 indicate that up to 3 words (0 to 3 words) may be skipped in between two tokens. In this way, the tokens 914 and 916 identify the distance from the key phrase, and therefore the token 912 identifies text within three (3) words of the key phrase. Further the token 920 includes a negation (NOT) in polarity field 924 with wildcards in lemma and parts-of-speech fields 922 and 926, corresponding to any negative polarity text. Additionally, the token 930 includes a text "work" in lemma field 9:32, with wildcard entries in polarity and parts-of-speech fields 934 and 936. The four tokens may be used together to identify a sentence including a key phrase and the word "NOT" within three words of the key phrase and the word "work." In this scenario, the tokens 900, 910, 920 and 930 will identify the sentence "the new search still does not work, everyone on the planet knows it so why are we still being forced to play this stupid game?"

Figure 10:
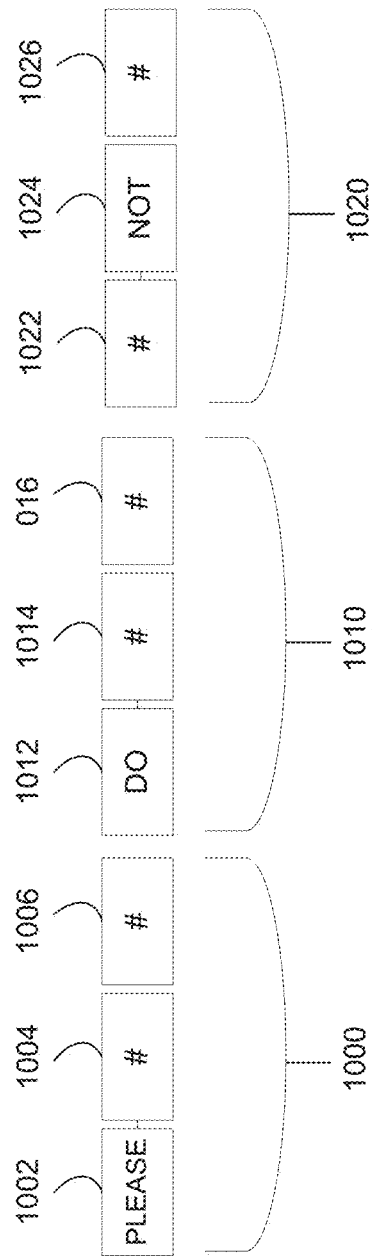

FIG. 10 illustrates another example of a combination of tokens used to retrieve specific text. The tokens 1000, 1010 and 1020 are used to identify text including the words "please" and "do,' which has a negative polarity. The lemma field 1002 of token 1000 has an entry of "please," while the other fields 1004 and 1006 have wildcard entries. Similarly, the lemma field 1012 of token 1010 has an entry of "do," while the other fields 1014 and 1016 have wildcard entries. Finally, the token 1020 has a NOT entry in the polarity field 1024, with wildcards in fields 1022 and 1024. In one scenario, the tokens 1000, 1010 and 1020 identify the text "Please do not roll out this new search."

Some other patterns defined by multiple tokens include:
_NOT_#         (((want|think|use|need|believe|get)_#_#)|
  (make_#_#sense_#_#))
which will identify or match with text such as the sentence
  "I do not want Huge pictures and all the junkR like feedback and all the other things [the new search] brings up;" and
(get|bring|give|put|change)_#_#GAP_0_3
  FEA_#_#GAP_0_3 back_#_#
which will identify or match with text such as the sentence
  "Put the Old Search and Browse back!!!!!"

The patterns may be coded into computer-readable instructions, such as illustrated in FIG. 11. The code 1100 is a pattern made up of several tokens, wherein the pattern has definitions as defined in Table I.

TABLE I

Pattern Definitions

| | |
|---|---|
| P | POSITIVE |
| N | NEGATIVE |
| U | NEUTRAL |
| NT | NEGATION |
| TPC | TOPIC |
| GP | GAP |

In one embodiment, a pattern is a list of pre-defined tokens and serves as a rule for determining the sentiment of a sentence. Each token is an individual word or phrase. For each given sentence, the syntactic analyzer builds a syntactic tree. If all the tokens in a rule may be matched in the syntactic tree, then the rule may be applied to the target sentence.

Figure 12:
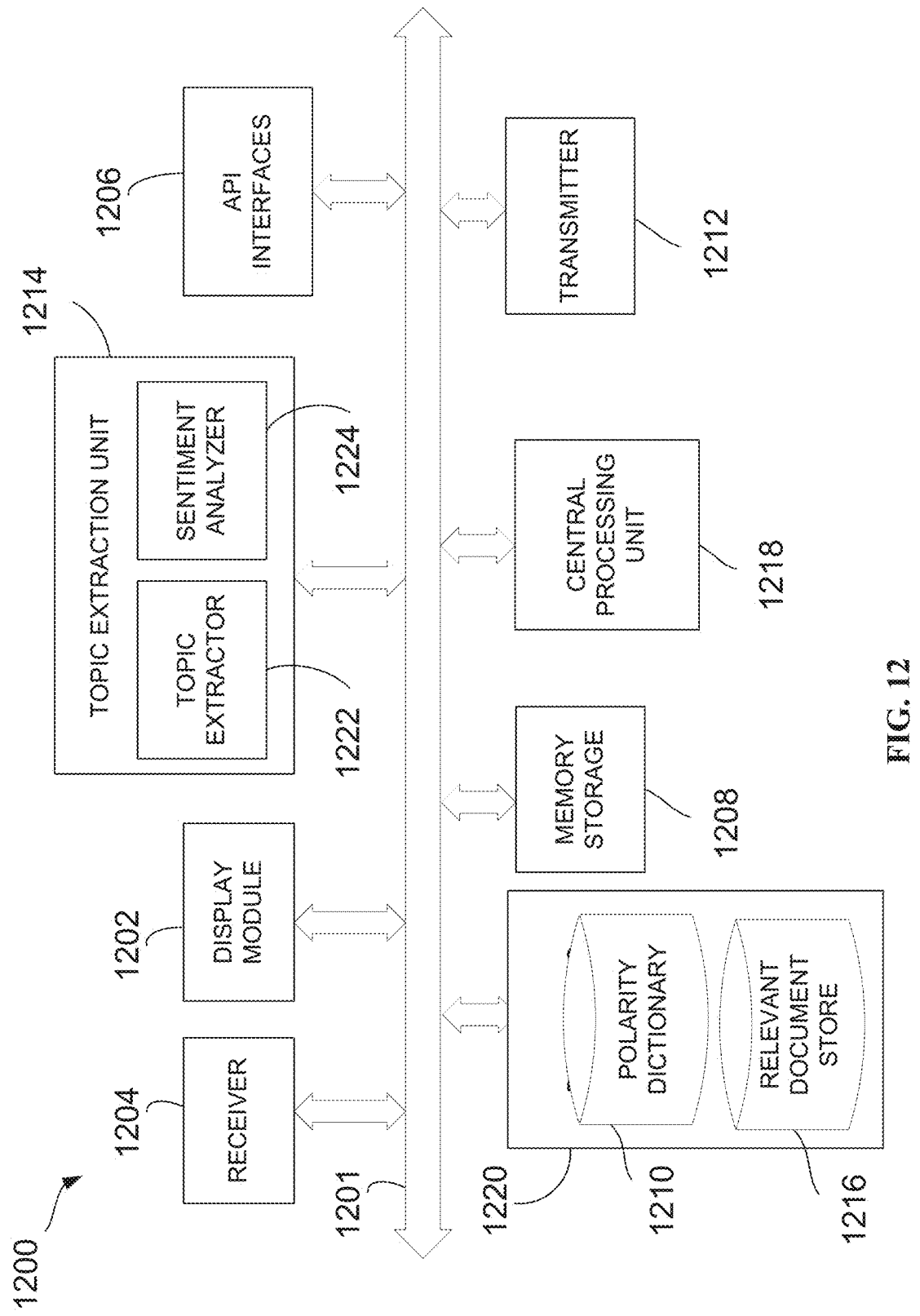
FIG. 12 is a block diagram of a system to extract topics and analyze sentiment of texts, according to an example embodiment.

FIG. 12 illustrates a system for implementing a topic extraction and analysis method according to an example embodiment. The system 1200 includes a communication bus 1201, coupling the various units within the system 1200. A central processing unit 1218 controls operations within the system 1200 and is responsive to execute computer-readable instructions for operations within the system 1200. A topic extraction unit 1214 is coupled to the interfaces 1206, which may include an Application Programming Interface (API). The topic extraction unit 1214 receives information and control information from a user via the interfaces 1206. In some embodiments the interfaces 1206 are coupled directly to topic extraction unit 1214. The topic extraction unit 1214 includes a topic extractor 1222, which is similar to topic extractor 1202 of FIG. 3, and further includes the sentiment analyzer 1224, which is similar to the sentiment analyzer 1222 of FIG. 3. The topic extractor unit 1214 receives information from the databases 1220 and memory storage 1208 via the communication bus 1201. The databases 1220 includes a polarity dictionary 1210 having listings for a variety of words or phrases that are associated with polarity comments, such as words to indicate a negative aspect or a positive aspect of a product or service. The databases 1220 further includes a relevant documents store 1216, which identifies those documents which are determined as relevant based on the keywords. The system 1200 performs the operations described with respect to the various methods and apparatuses described herein.

The system 1200 further includes a receiver 1204 and a transmitter 1212 to facilitate wireless communications. Some embodiments have no wireless capability.

Figure 13:
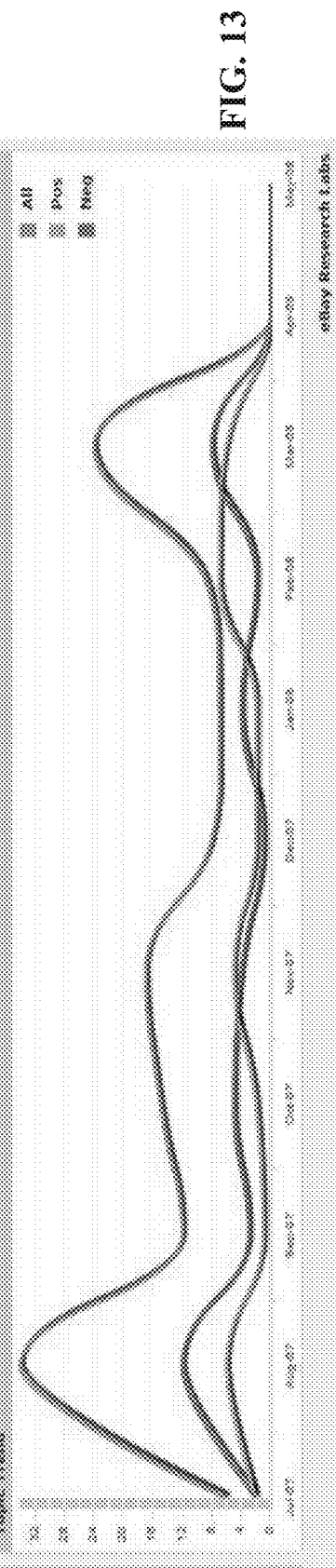
FIG. 13 is a graphical user interface reporting topic extraction and sentiment analysis, according to an example embodiment.

FIG. 13 illustrates a graphical user interface for reporting topic extraction and sentiment analysis, wherein texts and phrases are listed in a top portion, and a graph of the polarity analysis in the bottom portion. For each expression or sentence, the polarity words are identified. The positive words are indicated in green, while the negative words are indicated in red. The number of words for each polarity type are then plotted over time. This information may be used to identify positive or negative trends associated with release of features, upgrades, applications, services and so forth. The methods described hereinabove may be used to extract the topics and analyze the sentiment for generation of the information of FIG. 13.

The functions of the various modules and components of system 1200 may be implemented in software, firmware, hardware, an Application Specific Integrated Circuit (ASIC) or combination thereof. A specific machine may be implemented in the form of a computer system, within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system, such as system 1200, includes a processor, such as central processing unit 1218, which includes or executes instructions for operations and functions performed within and by the computer system. Further, the memory storage 1208 may include instructions for storage in and control of memory storage 1208. A static memory or other memories (not shown) may also be provided. Similarly, the memory storage 1208 may be partitioned to accommodate the various functions and operations within the system 1200.

The system 1200 may further include a video display unit (e.g., a Liquid Crystal Display (LCD) or a Cathode Ray Tube (CRT)) (not shown). The system 1200 may also include an input device to access and receive computer-readable instructions from a medium having instructions for storing and controlling the computer-readable medium.

Certain embodiments are described herein as including logic or a number of components, modules, or mechanisms. A component may be any tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic permanently configured (e.g., as a special-purpose processor) to perform certain operations. A component may also comprise programmable logic or circuitry (e.g., as encompassed within a general-purpose processor or other programmable processor) temporarily configured by software to perform certain operations. It may be appreciated that the decision to implement a component mechanically, in dedicated and permanently configured circuitry, or in temporarily configured circuitry (e.g., configured by software) may be driven by cost and time considerations.

Accordingly, the term "component" may be understood to encompass a tangible entity, be that an entity physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiples of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation and store the output of that operation in a memory device to which it is communicatively coupled. A further component may, at a later time, access the memory device to retrieve and process the stored output. Components may also initiate communications with input or output devices, and can operate on a resource (e.g., a collection of information).

Example embodiments may be implemented in digital electronic circuitry, or in computer hardware, firmware, software, or in combinations of these. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., as a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers having a client-server relationship to each other. In embodiments deploying a programmable computing system, it may be appreciated that both hardware and software architectures require consideration. Specifically, it may be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

As illustrated in FIG. 12, the machine-readable medium 922 of disk drive unit 916 stores one or more sets of instructions 925 and data structures (e.g., software) embodying or utilized by any one or more of the methodologies or functions described herein. The software may also reside, completely or at least partially, within the main memory 901 and/or within the processor 902 during execution thereof by the computer system 900, the main memory 901 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium capable of storing, encoding or carrying instructions for execution by the machine and that cause the machine to perform any one or more of the methodologies presented herein or capable of storing, encoding or carrying data structures utilized by or associated with such instructions. The term "machine-readable medium" shall accordingly be taken to include, but not be limited to, tangible media, such as solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions used within computer system 900 may further be transmitted or received over a communications network 926 using a transmission medium. The instructions, and other information, may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible medium to facilitate communication of such software.

In some embodiments, the described methods may be implemented using one of a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology or a variety of technologies. The example three-tier architecture, and the technologies through which it is implemented, may be realized on one or more computer systems operating, for example, as a standalone system, or organized in a server-client, peer-to-peer, distributed, or some other suitable configuration. Further, these three tiers may be distributed between more than one computer systems as various components.

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Some example embodiments may include remote procedure calls being used to implement one or more of the above described components across a distributed programming environment as distributed computing components. For example, an interface component (e.g., an interface tier) may form part of a first computer system remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

Example embodiments may use the OSI model or TCP/IP protocol stack model for defining the protocols used by a network to transmit data. In applying these models, a system of data transmission between a server and client, or between peer computer systems, may, for example, include five layers comprising: an application layer, a transport layer, a network layer, a data link layer, and a physical layer. In the case of software for instantiating or configuring components having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally Asynchronous Transfer Mode (ATM), Synchronous Network Architecture (SNA), Serial Data Interface (SDI), or some other suitable protocol. These networks may be organized within a variety of topologies (e.g., a star topology), or structures.

Although an embodiment has been described with reference to specific example embodiments, it may be evident that various modifications and changes may be made to these embodiments without departing from the broader spirit and scope of the present discussion. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it may be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, may be apparent to those of ordinary skill in the art upon reviewing the above description.

What is claimed is:

1. A method comprising:
    accessing target documents obtained from one or more client devices;
    searching, by a topic extractor, the target documents to identify key phrases related to different topics;
    ranking, by the topic extractor, the key phrases by applying a ranking algorithm that is computed as a function of Term Frequency-Inverse Document Frequency (TF-IDF) weights;
    identifying key phrases having rankings that exceed a threshold, the identified key phrases indicating essential topics, the identifying being based on a key phrase extraction process that builds a model based on training documents and uses the model to predict a likelihood of each phrase in a target document;
    assigning, using one or more hardware processors, a polarity impact to one or more words of the target documents, the polarity impact being a score identifying an impact of the one or more words on a given topic of the essential topics;
    identifying one or more opinion trends for at least one essential topic based on the polarity impact of the one or more words of the target documents by identifying a number of words for each polarity type over time for the at least one essential topic; and
    causing display of a report in a user interface of a further client device, the report comprising one or more graphical indicators of the one or more opinion trends for the at least one essential topic, the report further indicating the polarity impact of the one or more words.

2. The method of claim 1, further comprising:
    determining that a word of the one or more words is a polarity word based on matching the word to another word in a dictionary of polarity words,
    wherein the assigning of the polarity impact to the one or more words of the target documents is based on the polarity word having a dominant impact on a topic.

3. The method of claim 1, wherein the assigning of the polarity impact to the one or more words of the target documents is based on a sum of polarities method.

4. The method of claim 1, wherein the assigning of the polarity impact to the one or more words of the target documents is based on a syntactic distance between the one or more words and a topic key phrase in a syntactic tree.

5. The method of claim 1, wherein the identifying of the one or more opinion trends based on the polarity impact of the one or more words includes generating a ratio of positive feedback to negative feedback.

6. The method of claim 1, wherein the identifying of the one or more opinion trends based on the polarity impact of the one or more words includes:
    identifying, using the polarity impact of the one or more words of the target documents, a first opinion associated with a first item and a second opinion associated with a second item; and
    comparing the first opinion and the second opinion,
    wherein the report includes an indication of a result of the comparing of the first opinion and the second opinion.

7. The method of claim 1, wherein the report includes one or more sentences included in the target documents, the polarity impact of the one or more words being indicated graphically within the one or more sentences.

8. The method of claim 7, wherein the graphic indication of the polarity impact of the one or more words within the one or more sentences includes representing words with positive impact with a first color and words with a negative impact with a second color.

9. The method of claim 1, wherein the causing display of the report in the user interface of the further client device includes generating a corresponding graph by plotting a number of words for each polarity impact and presenting the graph in the user interface.

10. A system comprising:
    one or more hardware processors; and
    a non-transitory computer-readable medium storing instructions that, when executed by the one or more hardware processors, cause the one or more hardware processors to perform operations comprising:
        accessing target documents obtained from one or more client devices;
        searching, by a topic extractor, the target documents to identify key phrases related to different topics;
        ranking, by the topic extractor, the key phrases by applying a ranking algorithm that is computed as a function of Term Frequency-Inverse Document Frequency (TF-IDF) weights;
        identifying key phrases having rankings that exceed a threshold, the identified key phrases indicating essential top topics, the identifying being based on a key phrase extraction process that builds a model based on training documents and uses the model to predict a likelihood of each phrase in a target document;
        assigning, using one or more hardware processors, a polarity impact to one or more words of the target documents, the polarity impact being a score identifying an impact of the one or more words on a given topic of the essential topics;
        identifying one or more opinion trends for at least one essential topic based on the polarity impact of the one or more words of the target documents by identifying a number of words for each polarity type over time for the at least one essential topic; and causing display of a report in a user interface of a further client device, the report comprising one or more graphical indicators of the one or more opinion trends for the at least one essential topic, the report further indicating the polarity impact of the one or more words.

11. The system of claim 10, wherein the operations further comprise:
determining that a word of the one or more words is a polarity word based on matching the word to another word in a dictionary of polarity words,
wherein the assigning of the polarity impact to the one or more words of the target documents is based on the polarity word having a dominant impact on a topic.

12. The system of claim 10, wherein the assigning of the polarity impact to the one or more words of the target documents is based on a sum of polarities method.

13. The system of claim 10, wherein the assigning of the polarity impact to the one or more words of the target documents is based on a syntactic distance between the one or more words and a topic key phrase in a syntactic tree.

14. The system of claim 10, wherein the identifying of the one or more opinion trends based on the polarity impact of the one or more words includes generating a ratio of positive feedback to negative feedback.

15. The system of claim 10, wherein the identifying of the one or more opinion trends based on the polarity impact of the one or more words includes:
identifying, using the polarity impact of the one or more words of the target documents, a first opinion associated with a first item and a second opinion associated with a second item; and
comparing the first opinion and the second opinion,
wherein the report includes an indication of a result of the comparing of the first opinion and the second opinion.

16. The system of claim 10, wherein the report includes one or more sentences included in the target documents, the polarity impact of the one or more words being indicated graphically within the one or more sentences.

17. The system of claim 16, wherein the graphic indication of the polarity impact of the one or more words within the one or more sentences includes representing words with positive impact with a first color and words with a negative impact with a second color.

18. The system of claim 10, wherein the causing display of the report in the user interface of the further client device includes presenting a corresponding graph representing a number of words for each polarity impact, one or more times associated with the corresponding graph indicating one or more times of generation of the target documents.

19. A non-transitory computer-readable medium storing instructions that, when executed by the one or more hardware processors, cause the one or more hardware processors to perform operations comprising:
accessing target documents obtained from one or more client devices;
searching, by a topic extractor, the target documents to identify key phrases related to different topics;
ranking, by the topic extractor, the key phrases by applying a ranking algorithm that is computed as a function of Term Frequency-Inverse Document Frequency (TF-IDF) weights;
identifying key phrases having rankings that exceed a threshold, the identified key phrases indicating essential topics, the identifying being based on a key phrase extraction process that builds a model based on training documents and uses the model to predict a likelihood of each phrase in a target document;
assigning, using one or more hardware processors, a polarity impact to one or more words of the target documents, the polarity impact being a score identifying an impact of the one or more words on a given topic of the essential topics;
identifying one or more opinion trends for at least one essential topic based on the polarity impact of the one or more words of the target documents by identifying a number of words for each polarity type over time for the at least one essential topic; and
causing display of a report in a user interface of a further client device, the report comprising one or more graphical indicators of the one or more opinion trends for the at least one essential topic, the report further indicating the polarity impact of the one or more words.

20. The non-transitory computer-readable medium of claim 19, wherein the identifying of the one or more opinion trends based on the polarity impact of the one or more words includes:
identifying, using the polarity impact of the one or more words of the target documents, a first opinion associated with a first item and a second opinion associated with a second item; and
comparing the first opinion and the second opinion,
wherein the report includes an indication of a result of the comparing of the first opinion and the second opinion.

* * * * *